(12) United States Patent
Bhatt et al.

(10) Patent No.: US 9,988,990 B2
(45) Date of Patent: Jun. 5, 2018

(54) DUAL FUEL GENERATOR SYSTEM

(71) Applicant: CLARK EQUIPMENT COMPANY, Statesville, NC (US)

(72) Inventors: Chinmay Bhatt, Statesville, NC (US); Nicholas Harknett, Statesville, NC (US); Dale Herbstritt, Statesville, NC (US)

(73) Assignee: Clark Equipment Company, Statesville, NC (US)

( * ) Notice: Subject to any disclaimer, the term of this patent is extended or adjusted under 35 U.S.C. 154(b) by 361 days.

(21) Appl. No.: 14/679,570

(22) Filed: Apr. 6, 2015

(65) Prior Publication Data
US 2016/0290247 A1 Oct. 6, 2016

(51) Int. Cl.
| | |
|---|---|
| *F02M 43/00* | (2006.01) |
| *F02D 19/06* | (2006.01) |
| *F02B 63/04* | (2006.01) |
| *F02D 29/06* | (2006.01) |
| *F02M 21/02* | (2006.01) |
| *F02B 43/00* | (2006.01) |

(52) U.S. Cl.
CPC ........ *F02D 19/0615* (2013.01); *F02B 63/047* (2013.01); *F02D 19/0647* (2013.01); *F02D 19/0668* (2013.01); *F02D 29/06* (2013.01); *F02M 21/0215* (2013.01); *F02B 43/00* (2013.01); *Y02T 10/32* (2013.01); *Y02T 10/36* (2013.01)

(58) Field of Classification Search
CPC . F02D 19/0647; F02M 21/0215; F02B 43/00; F02B 63/047
See application file for complete search history.

(56) References Cited

U.S. PATENT DOCUMENTS

| | | | |
|---|---|---|---|
| 4,463,735 A | * | 8/1984 | Stoltman ................. F02B 43/00 123/525 |
| 4,619,240 A | | 10/1986 | Bedford et al. |
| 5,224,457 A | | 7/1993 | Arsenault et al. |
| 5,668,310 A | * | 9/1997 | Parkman ................. G07C 5/085 123/525 |
| 5,999,888 A | | 12/1999 | Aubee |
| 6,543,395 B2 | | 4/2003 | Green |
| 2012/0168023 A1 | | 7/2012 | Folken et al. |
| 2014/0202430 A1 | | 7/2014 | Monros |
| 2014/0366577 A1 | * | 12/2014 | Zubrin .................. F25J 3/0209 62/619 |

FOREIGN PATENT DOCUMENTS

| | | |
|---|---|---|
| DE | 10248228 | 4/2003 |
| DE | 102007051631 | 6/2008 |
| GB | 1410525 | 10/1975 |

* cited by examiner

*Primary Examiner* — Kevin A Lathers
(74) *Attorney, Agent, or Firm* — Michael Best & Friedrich LLP

(57) ABSTRACT

A movable electrical generation system includes a generator operable to produce a supply of electrical energy, a prime mover operable to drive the generator, and a first fuel supply selectively deliverable to the movable electrical generation system in a first pressure range. A second fuel, different from the first fuel is selectively deliverable to the prime mover in a second pressure range. A controller is operable to automatically deliver the second fuel to the prime mover in response to the first fuel having a pressure outside of the first pressure range.

23 Claims, 4 Drawing Sheets

DUAL FUEL GENERATOR SYSTEM

BACKGROUND

Engines are often used to power portable equipment such as pumps, compressors, generators, and the like. In some situations, the engines are arranged to operate using two different fuel sources. In one example, an engine uses either propane or natural gas to operate and drive an electrical generator.

SUMMARY

In one construction, a movable electrical generation system includes a generator operable to produce a supply of electrical energy, a prime mover operable to drive the generator, and a first fuel supply selectively deliverable to the movable electrical generation system in a first pressure range. A second fuel, different from the first fuel is selectively deliverable to the prime mover in a second pressure range. A controller is operable to automatically deliver the second fuel to the prime mover in response to the first fuel having a pressure outside of the first pressure range.

In another construction, a movable electrical generation system includes a generator operable to produce a supply of electrical energy, a prime mover operable to drive the generator, and a first fuel supply selectively deliverable to the prime mover in a first pressure range. A second fuel, different from the first fuel i selectively deliverable to the prime mover in a second pressure range and a controller is operable to automatically deliver the second fuel to the prime mover in response to the first fuel having a pressure outside of the first pressure range. A manual fuel selector is operable to override the controller and force delivery of a selected one of the first fuel supply and the second fuel supply regardless of the pressure of the first fuel supply, and an indicator is operable to measure a delivered fuel pressure and non-numerically indicate which of the first fuel and the second fuel is being delivered to the prime mover.

In yet another construction, a movable electrical generation system includes a generator operable to produce a supply of electrical energy, a prime mover operable to drive the generator, and a raw wellhead natural gas fuel supply selectively deliverable to the movable electrical generation system in a first pressure range. A scrubbing system receives the raw wellhead natural gas fuel supply and conditions the raw wellhead natural gas fuel supply to deliver a combustible natural gas fuel supply to the prime mover in a second pressure range. A second, non-natural gas fuel is selectively deliverable to the prime mover in a third pressure range, and a controller is operable to automatically deliver the second fuel to the prime mover in response to the combustible natural gas fuel supply having a pressure outside of the second pressure range.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
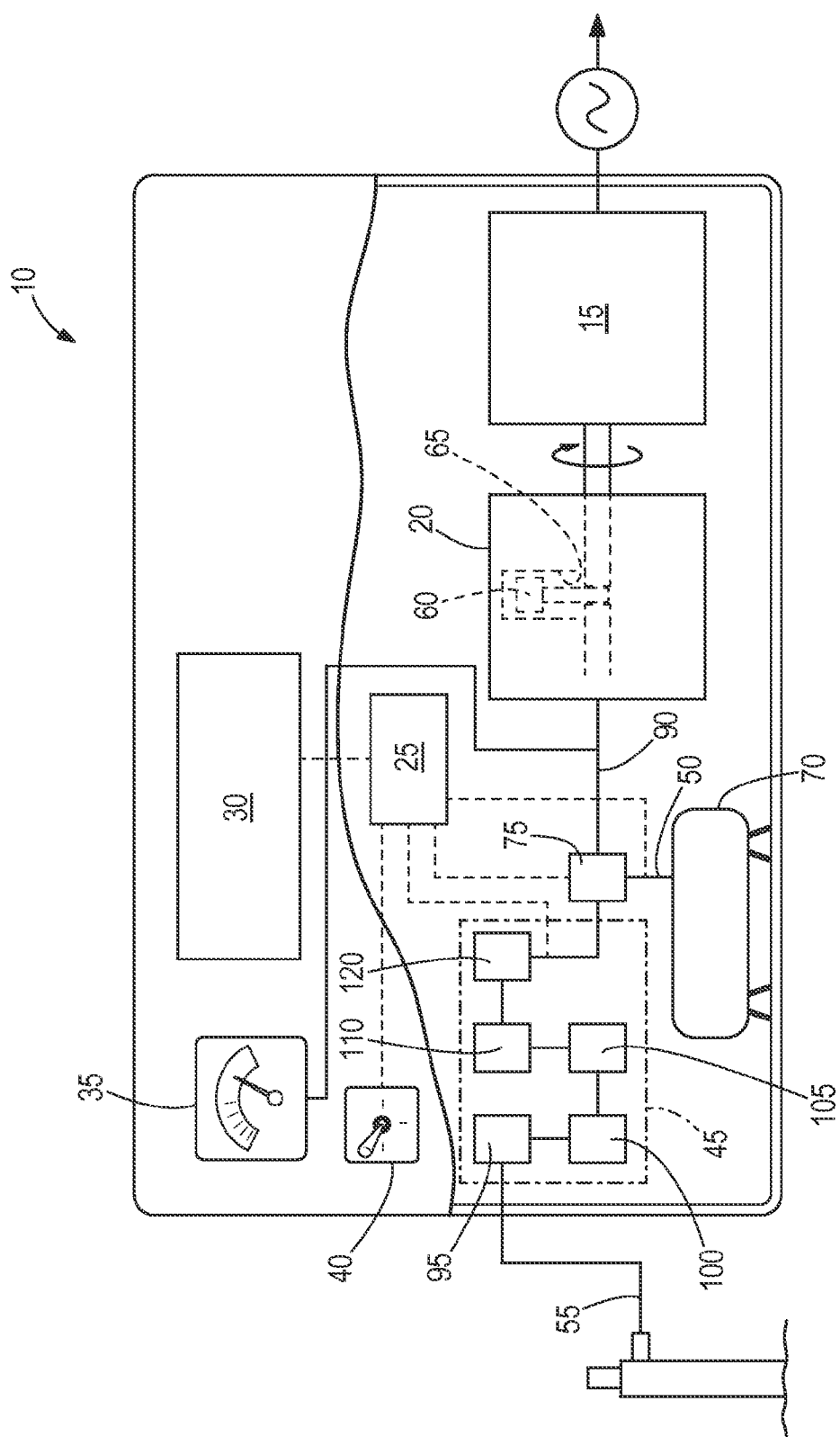
FIG. 1 is a schematic illustration of a mobile generator system.

FIG. 1 schematically illustrates a movable electrical generation system 10 that can be moved to a desired location and operated to produce a desired electrical output. The system 10 includes a generator 15, a prime mover or engine 20, a controller 25, an interface system 30, a fuel indicator 35, a fuel selector switch 40, a scrubbing system 45, a first fuel supply 50 and a second separate fuel supply 55.

In the illustrated construction, the engine 20 includes a reciprocating piston engine (e.g., internal combustion, compression ignition, etc.) which is employed to drive the generator 15. In the reciprocating piston engine 20, one or more pistons 60 are arranged to reciprocate in an equal number of cylinders 65 to provide the necessary shaft power to drive the generator 15. Of course, other types of engines 20 could be employed as the prime mover as may be desired or required. In preferred constructions, the generator 15 is operable to output a single phase or three phase AC electrical power at a desired voltage and frequency. In some constructions, the generator 15 includes transformers that allow for the output of current at multiple desired voltages. In still other constructions, the generator 15 is arranged to provide a DC power supply at a desired voltage.

The first fuel supply 50 is stored in an on-board or external tank 70 and is fluidly coupled to the engine 20 to provide the first fuel 50 to the engine 20. Possible first fuels 50 include but are not limited to propane, gasoline, diesel, kerosene, etc. with liquid propane (LP) being preferred. The first fuel 50 flows from the tank 70 to a fuel selector valve 75 before it is directed to the engine 20. The first fuel 50 is delivered to the valve 75 and to the engine 20 at a pressure that is suitable for operation of the engine 20. The pressure of the first fuel 50 is closely regulated to assure that it is delivered to the engine 20 in a first desired range 80. In a preferred construction, the first range 80 is between about 11.5 and 14 inches of water.

The second fuel supply 55 is preferably well-head natural gas. Well-head natural gas is unregulated (pressure), unfiltered, potentially wet, unclean natural gas. Due to these features of well-head natural gas, it cannot be used in the same manner as pipeline natural gas. Rather, the well-head natural gas 55 first passes through the scrubbing system 45 to prepare the fuel 55 for combustion in the engine 20. After exiting the scrubbing system 45, the prepared well-head gas 55 flows to the fuel selector valve 75. Like the first fuel supply 50, the pressure of the second fuel supply 55 is closely regulated to assure delivery to the fuel selector valve 75 and to the engine 20 at a pressure within a second range 85. In preferred constructions, the second range 85 is between about 8 and 11.5 inches of water. The first range 80 and the second range 85 are selected and controlled to assure that they do not overlap but still fall within a pressure range that is suitable for use by the engine 20.

In preferred constructions, the fuel selector valve 75 is a solenoid operated valve that is movable to at least a first position in which the valve 75 allows flow from the first fuel source 50 to the engine 20 and inhibits flow of the second fuel 55, and a second position in which the valve 75 allows flow from the second fuel source 55 to the engine 20 and inhibits flow of the first fuel 50. A fuel line 90 extends from the fuel selector valve 75 to the engine 20 to deliver the selected fuel 50, 55 to the engine 20.

Figure 3:
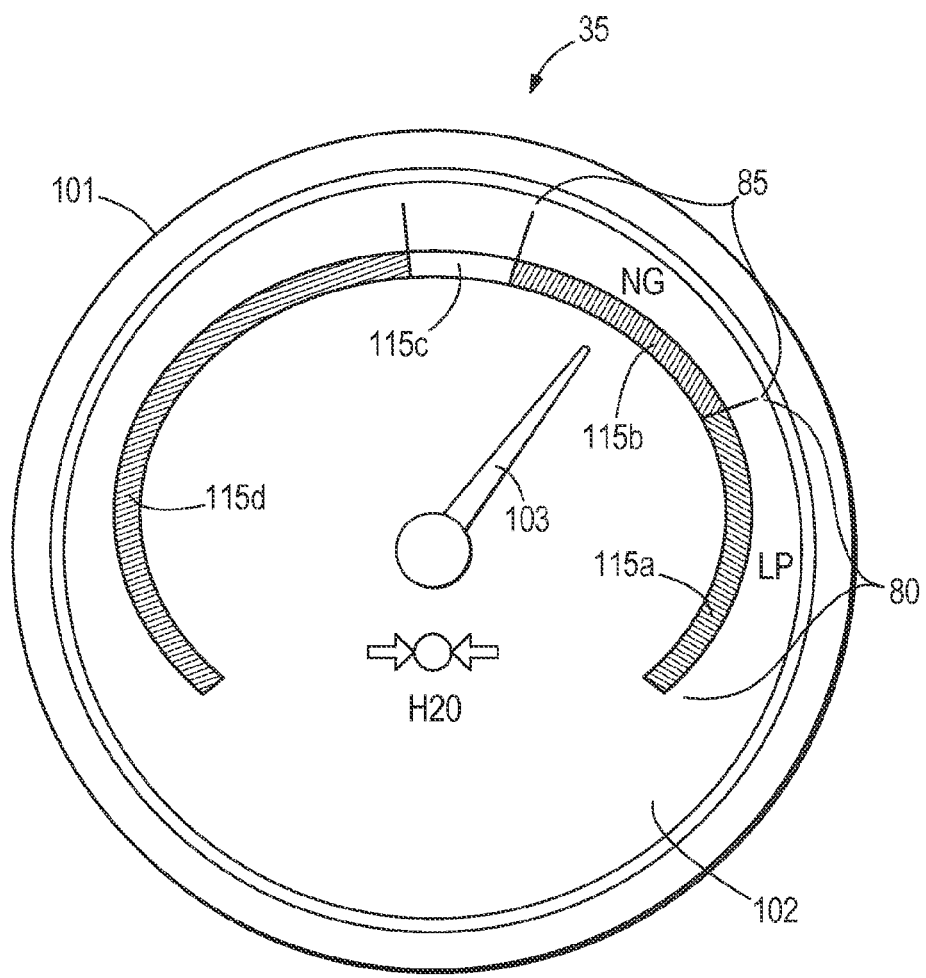
FIG. 3 is a front view of a pressure gauge.

A pressure tap line 95 extends from the fuel line 90 to the fuel indicator 35 to physically connect the fuel indicator 35 to the fuel line 90 and the fuel 50, 55 being delivered to the engine 20. The fuel indicator 35, illustrated in FIG. 3, includes a mechanical pressure gauge 101 such as a Bourdon pressure gauge that uses the pressure tap line 95 to measure the pressure of the fuel 50, 55 being delivered to the engine 20. The fuel indicator 35 includes a faceplate 102 and a needle 103 that cooperate to display the result of the pressure measurement. The faceplate 102 is divided into zones 115 that may be differently colored or otherwise distinguished to identify those zones 115. One of the zones 115a corresponds to the first range 80 and is labeled to identify the first fuel 50. In the construction illustrated in FIG. 3, the first zone 115a is labeled "LP" for liquid propane. A second of the zones 115b corresponds to the second range 85 and is labeled to identify the second fuel 55. In the construction illustrated in FIG. 3, the second zone 115b is labeled "NG" for natural gas. The remaining zones 115 may be color coded or labeled for other purposes. For example, a zone 115c in the pressure range below the second zone 115b may be color coded yellow to indicate a low-pressure warning zone. A zone 115d below the low-pressure warning zone 115c might be colored red to indicate a low-pressure alarm zone. Thus, the fuel indicator 35 provides a non-numeric indication of the fuel 50, 55 being used by the engine 20. The ranges 80, 85 are easily identifiable and no numbers or knowledge of the actual fuel pressures is required. Of course, other constructions could use different non-numerical displays to indicate the fuel 50, 55 being used. For example, one construction uses a visual display to display the name of the fuel 50, 55 based on the measured pressure. A simple circuit or microprocessor determines which range the measured pressure falls within and selects the desired display based on that measured value.

The controller 25 preferably includes one or more microprocessor-based controls that operate to control all operating aspects of the mobile electrical generation system 10. The controller 25 can be used to control the generator operation to assure the electrical output is at the proper voltage. In addition, the controller 25 may include an engine control unit that can control the engine 20 to minimize undesirable emissions, maximize fuel efficiency, and operate at the proper speed to assure the electrical output is at the proper frequency. The controller 25 receives signals indicative of the first fuel pressure and the second fuel pressure upstream of the fuel selector valve 75. The controller 25 uses these pressure values to determine where the valve 75 should be positioned. For example, if both measured pressures are within their desired operating range 80, 85, the controller 25 could select either fuel 50, 55. In this case, the controller 25 selects the preferred or default fuel, in the illustrated construction well-head natural gas 55. If one of the two pressure values is outside of its desired range 80, 85, the controller 25 automatically selects the fuel 50, 55 that is in the proper range 80, 85 and transitions or maintains the fuel selector valve 75 in the proper position. The controller 25 also adjusts the engine operation to match the fuel being used. In preferred constructions the controller 25 may adjust ignition timing, fuel/air ratios, fuel flow rates, and the like to assure proper engine operation. The controller 25 also receives inputs from and provides various outputs to a user control panel which is part of the interface system 30. The inputs could include start/stop signals, voltage settings for the generator 15, and the like. Outputs could include voltage indications, frequency indications, various temperatures, speed, warning indicators, and the like.

The fuel selector switch 40 provides an input signal to the controller 25 that allows a user to override the controller's fuel selection decision. In the illustrated construction, the switch 40 is a three position toggle switch. In a first position, the switch 40 sends a signal to the controller 25 that overrides the controller's fuel selection decision and forces the use of the first fuel 50 regardless of the measured pressure of that fuel 50. In a second position, the switch 40 sends a signal to the controller 25 that overrides the controller's fuel selection decision and forces the use of the second fuel 55 regardless of the measured pressure of that fuel 55. In a third position, the fuel selector switch 40 sends a signal that allows the controller 25 to make the fuel selection decision based on the measured pressures.

Figure 2:
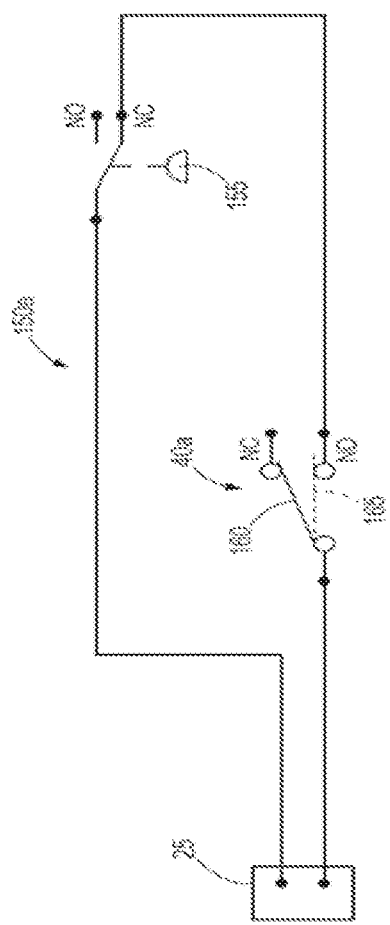
FIG. 2 is an electrical schematic of a dual fuel system with an override.
Figure 4:
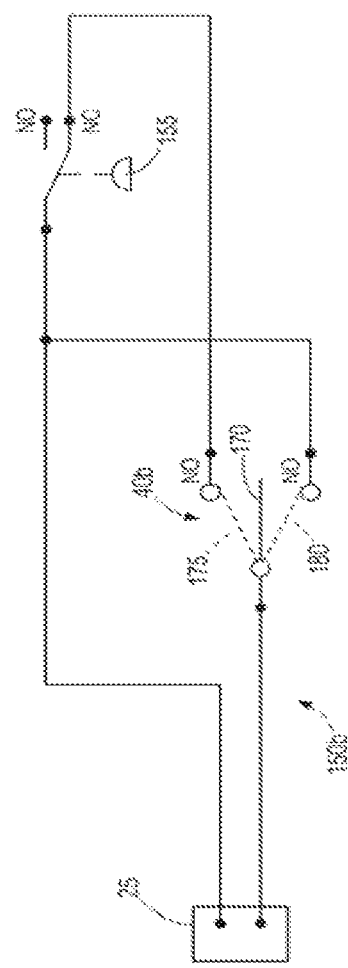
FIG. 4 is another electrical schematic of a dual fuel system with an override.

FIGS. 2 and 4 illustrate two possible circuits 150a, 150b suitable for use with the fuel selector switch 40 of FIG. 1. FIG. 2 illustrates the circuit 150a of FIG. 2 including a two position switch 40a, while the circuit 150b of FIG. 2 includes a three position fuel selector switch 40b. The circuit 150a of FIG. 2 includes a normally closed pressure switch 155 that is coupled to the primary fuel supply 55. The pressure switch remains closed until the pressure of the primary fuel source 55 (natural gas in this example) exceeds a predetermined value (e.g., 8 inches of water) at which point, the pressure switch 155 closes which opens the circuit 150a at the pressure switch 155. The fuel selector switch 40a is movable between a first position 160 (shown in solid in FIG. 2) in which the circuit 150a is opened and a second position 165 in which the circuit 150b is closed. In operation, if the primary fuel supply 55 has a pressure that is sufficient to close the pressure switch 155, it will open the circuit 150b no matter the position of the fuel selector switch 40a. The controller 25 senses the open circuit which it interprets as an instruction to utilize the primary fuel supply 55. When the primary fuel supply pressure is not sufficient to close the switch 155, the pressure switch portion of the circuit 150a remains closed which allows the fuel selector switch 40a to control the fuel being delivered. If the fuel selector switch 40a is in the first position 160, the circuit 150a is opened and the controller 25 interprets this as an instruction to use the primary fuel supply 55. However, if the fuel selector switch 40a is in the second position 165, the circuit 150a will be closed. The controller 25 interprets the closed circuit as an instruction to use the secondary fuel supply 50 (liquid propane in this example). The system 10 would continue to use the secondary fuel 50 until the fuel selector switch 40a is moved to the first position 160 to open the circuit or the pressure switch 155 is closed by sufficient primary fuel pressure to again open the circuit 150a. Thus, the circuit 150a of FIG. 2 allows a user to either force the use of the primary fuel 55 regardless of its pressure or allows for the selection of the fuel being used based on the primary fuel pressure. The following table illustrates the switch/circuit arrangements and the result.

| Option | Pressure Switch 155 | Fuel Selector Switch 40a | Resulting Fuel |
|---|---|---|---|
| 1 | Closed (Pressure below predetermined value) | First Position 160 (opened circuit) | Primary Fuel 55 |
| 2 | Closed (Pressure below predetermined value) | Second Position 165 (closed circuit) | Secondary Fuel 50 |

-continued

| Option | Pressure Switch 155 | Fuel Selector Switch 40a | Resulting Fuel |
|---|---|---|---|
| 3 | Opened (Pressure above predetermined value) | First Position 160 (opened circuit) | Primary Fuel 55 |
| 4 | Opened (Pressure above predetermined value) | Second Position 165 (closed circuit) | Primary Fuel 55 |

The circuit 150b of FIG. 4 is similar to the circuit 150a of FIG. 2 but includes a three position fuel selector switch 40b. The circuit 150b includes a pressure switch 155 that operates in the same manner as the pressure switch 155 of FIG. 2. The fuel selector switch 40b is movable to a first position 170 shown in FIG. 4 in which the circuit 150b is open. The fuel selector switch 40b is also movable to a second position 175 (up) in which the fuel selector switch 40b closes the portion of the circuit 150b that passes through the pressure switch 155. In this position, the position of the pressure switch 155 determines if the circuit 150b is opened or closed. Finally, the fuel selector switch 40b is movable to a third position 180 (down). In this position, a circuit that bypasses the pressure switch 155 is closed, thereby delivering a closed circuit signal to the controller 25 regardless of the position of the pressure switch 155. In operation, like the circuit 150a of FIG. 2, an open circuit signal at the controller 25 is interpreted as an instruction to use the primary fuel supply 55 and a closed circuit signal is interpreted as an instruction to operate using the secondary fuel 50. Thus, with the fuel selector switch 40b in the first position 170 illustrated in FIG. 4, both circuit paths are opened and the signal to the controller 25 will be an open circuit regardless of the position of the pressure switch 155. In this position, only the primary fuel 55 is used regardless of its pressure. With the fuel selector switch 40b in the second position 175 (up), the circuit path through the pressure switch 155 is the only path that can be closed. If the pressure switch 155 is open (and the circuit is closed) the circuit 150b will be closed and the secondary fuel 50 will be used. If the pressure of the primary fuel 55 rises and closes the pressure switch 155 (thereby opening the circuit), the circuit 150b will be opened and the controller 25 will operate the system using the primary fuel 55. Thus, the fuel selector switch 40b in the second (up) position 175 sets a mode of using either the primary fuel 55 or the secondary fuel 50 based on the pressure of the primary fuel 55. When the fuel selector switch 40b is in the third position 180 (down) a closed circuit that bypasses the pressure switch 155 is formed. Thus, the controller 25, sensing the closed circuit will operate the system 10 using only the secondary fuel 50 regardless of the pressure of the primary fuel 55. The following table illustrates the switch/circuit arrangements and the result.

| Option | Pressure Switch 155 | Fuel Selector Switch 40b | Resulting Fuel |
|---|---|---|---|
| 1 | Closed (Pressure below predetermined value) | First Position 170 (opened circuit) | Primary Fuel 55 |
| 2 | Closed (Pressure below predetermined value) | Second Position 175 (up, circuit including pressure switch) | Secondary Fuel 50 |
| 3 | Closed (Pressure below predetermined value) | Third Position 180 (down, circuit bypassing pressure switch) | Secondary Fuel 50 |
| 4 | Opened (Pressure above predetermined value) | First Position 170 (opened circuit) | Primary Fuel 55 |
| 5 | Opened (Pressure above predetermined value) | Second Position 175 (up, circuit including pressure switch) | Primary Fuel 55 |
| 6 | Opened (Pressure above predetermined value) | Third Position 180 (down, circuit bypassing pressure switch) | Secondary Fuel 50 |

With reference to FIG. 1, the scrubbing system 45 is illustrated as an on-board system that includes a primary pressure regulator 95, a coalescer 100, a dryer 105, a particulate filter 110, and a secondary pressure regulator 120. The primary pressure regulator 95 receives the incoming unregulated well-head gas 55 and regulates the pressure to a desired level. Preferably, the pressure is higher than the final desired pressure of the fuel 55 delivered to the engine 20 to account for pressure drops through the remaining components of the scrubbing system 45.

The regulated well-head gas 55 next enters the coalescer 100. The coalescer 100 is preferably a mechanical device that may include filters, baffles, flow diverters, flow directional and velocity changing devices and the like to aid in the coalescing process. The coalescer 100 operates to separate liquids such as water or hydrocarbon condensate from the well-head gas 55. In addition, the coalescer 100 may remove some particulate matter (e.g., dust, dirt, etc.) that may also be entrained in the flow of well-head gas 55.

The flow of well-head gas 55 exits the coalescer 100 and enters the dryer 105. In preferred constructions, adsorbent desiccant dryers 105 are used to remove additional water from the flow to reduce the likelihood of condensation anywhere within the system 10. In conditions where the system 10 is operated at low ambient temperatures, the dryer 105 should reduce the water level to a very low level to assure that condensation within the system 10 does not occur. During use, the desiccant adsorbs moisture from the flow of gas 55. Eventually, the desiccant must be replaced, replenished, or regenerated. In preferred constructions, a regenerating dryer 105 is used to allow the desiccant to regenerate and increase the time the desiccant can be used before it is replaced. Of course other dryers 105 including cyclonic dryers or coalescing dryers could be employed if desired.

After exiting the dryer 105, the now dry well-head gas 55 enters the particulate filter 110. The particulate filter 110 includes a filter element that is selected to filter the well-head gas 55 to a desired level of cleanliness. In other words, the filter element is selected to allow only particulates below a certain size to pass. Larger particles are captured by the filter element. The filtered gas 55 then flows to the secondary pressure regulator 120 which regulates the pressure to a level within the second range 85.

In operation, the electrical generation system 10 is first positioned in a location where electrical power is required. The generator output is connected to the desired loads and the well-head natural gas supply 55 is connected to an inlet of the system 10. The controller 25 is preprogrammed to select the natural gas fuel supply 55 when the pressure of the natural gas supply 55 falls within the second range 85. When the pressure does not fall within the second range 85, the controller 25 repositions the fuel selector valve 75 and propane or another secondary fuel 50 is supplied to the engine 20.

With the system 10 connected, a user initiates a start sequence and the engine 20 is started. In many situations, the engine 20 starts using the preferred or natural gas fuel 55. However, the sudden demand for the natural gas 55 at the start can cause a sudden pressure drop that the controller 25 interprets as a loss or failure of the natural gas supply 55. If this occurs, the controller 25 will immediately transition to the propane fuel supply 50. This often results in a failure of the engine 20 to start. To reduce the likelihood of this occurring, the fuel selector switch 40 can be positioned in one of the first position or the second position. If positioned in the first position, the controller 25 arranges the fuel selector valve 75 to deliver propane 50 to the engine 20 regardless of the measured pressure. Similarly, if positioned in the second position, the controller 25 arranges the fuel selector valve 75 to deliver natural gas 55 to the engine 20 regardless of the measured pressure. Thus, even if a low pressure is detected, the controller 25 does not attempt to switch fuels and the engine 20 is able to start as desired. Once started, the user can move the fuel selector switch 40 to the third position to allow the controller 25 to select the proper fuel based at least in part on the measured pressures of the fuels.

When operating on well-head gas 55, the gas is first regulated to a pressure suitable for use in the scrubbing system 45 but higher than the pressure to be supplied to the engine 20. The well-head gas 55 then flows into the coalescer 100 where liquid water, liquid hydrocarbons, and some particulate matter are removed from the flow. The well-head gas 55 then flows through the dryer 105 where additional moisture is removed from the flow. The moisture level is reduced to a point where the dew point of the flow of well-head gas 55 is below, and preferably well below the ambient temperature. Finally, the flow of well-head gas 55 passes through the filter 110 to remove any additional particulate matter and through the secondary pressure regulator 115 which reduces the pressure to a value within the second range 85.

The fuel selector valve 75 is positioned to direct the well-head natural gas 55 to the engine 20 for combustion. As the gas flows through the fuel line 90, the pressure is measured via the pressure tap line 95 and the fuel indicator 35 displays the non-numeric indication of the fuel being used.

If the pressure of the well-head natural gas 55 departs from the second range 85, the controller 25 detects it and transitions to the secondary fuel source 50, liquid propane in the illustrated construction. The controller 25 actuates the fuel selector valve 75 to cut off the flow of well-head natural gas 55 and allow for the flow of propane 50 to the engine 20. Again, the propane 50 flows through the fuel line 90 and the pressure is measured via the pressure tap line 95. The fuel indicator 35 displays the non-numeric indication showing that the fuel being used is the propane 50. If the pressure of the natural gas 55 returns to a value within the second range 85, the controller 25 will transition back to natural gas 55. The controller 25 may include time delays or pressure ranges that prevent unwanted switching when one or both of the fuel pressures is varying near one of the extremes of the respective ranges 80, 85. For example, in one construction, the system 10 operates on natural gas unless the pressure drops below 8 inches of water. At that point, the system switches to the secondary fuel, in this case liquid propane. The system will transition back to natural gas when the pressure exceeds 9 inches of water. Thus, there is a gap of 1 inch of water that reduces the likelihood of rapid and unwanted switching between the fuels.

Various features and advantages of the invention are set forth in the following claims.

What is claimed is:

1. A movable electrical generation system comprising:
   a generator operable to produce a supply of electrical energy;
   a prime mover operable to drive the generator;
   a first fuel at a first pressure;
   a second fuel different from the first fuel at a second pressure different from the first pressure;
   a fuel selector valve arranged to receive the first fuel at the first pressure and the second fuel at the second pressure and to deliver one of the first fuel and the second fuel to the prime mover; and
   a controller operable to automatically configure the fuel selector valve to deliver one of the first fuel or the second fuel to the prime mover based on the first pressure and the second pressure.

2. The movable electrical generation system of claim 1, wherein the prime mover includes a plurality of pistons that each reciprocate within one of a plurality of cylinders.

3. The movable electrical generation system of claim 1, wherein the first fuel is raw wellhead natural gas.

4. The movable electrical generation system of claim 3, further comprising a scrubbing system operable to receive the raw wellhead natural gas and output a flow of combustible natural gas.

5. The movable electrical generation system of claim 4, wherein the scrubbing system includes a primary pressure regulator operable to regulate the pressure of the raw wellhead natural gas to a third pressure.

6. The movable electrical generation system of claim 5, wherein the scrubbing system includes a coalescer and a dryer positioned to receive the raw wellhead natural gas from the primary regulator.

7. The movable electrical generation system of claim 6, wherein the scrubbing system includes a secondary pressure regulator operable to regulate the pressure of the raw wellhead natural gas leaving the coalescer and a dryer to the first pressure to produce the flow of combustible natural gas.

8. The movable electrical generation system of claim 3, wherein the second fuel is propane.

9. The movable electrical generation system of claim 1, wherein the first pressure is less than the second pressure.

10. The movable electrical generation system of claim 1, further comprising a gauge operable to measure a pressure of the fuel being delivered to the engine and non-numerically display which of the first fuel and the second fuel is being delivered to the engine based solely on the measured pressure.

11. The movable electrical generation system of claim 1, further comprising a manual fuel selector operable to override the controller and force delivery of a selected one of the first fuel and the second fuel regardless of the pressure of the first fuel.

12. A movable electrical generation system comprising:
a generator operable to produce a supply of electrical energy;
a prime mover operable to drive the generator;
a first fuel at a first pressure;
a second fuel different from the first fuel and at a second pressure different from the first pressure;
a fuel selector valve arranged to receive the first fuel and the second fuel and to deliver one of the first fuel or the second fuel to the prime mover;
a controller operable to move the fuel selector valve to deliver the second fuel to the prime mover in response to the first pressure being outside an acceptable pressure range;
a manual fuel selector operable to override the controller and force delivery of a selected one of the first fuel and the second fuel regardless of the pressure of the first fuel; and
an indicator operable to measure a delivered fuel pressure and non-numerically indicate which of the first fuel and the second fuel is being delivered to the prime mover.

13. The movable electrical generation system of claim 12, wherein the prime mover includes a plurality of pistons that each reciprocate within one of a plurality of cylinders.

14. The movable electrical generation system of claim 12, wherein the first fuel is natural gas and the second fuel is propane.

15. The movable electrical generation system of claim 12, wherein the acceptable pressure range does not include the second pressure.

16. A movable electrical generation system comprising:
a generator operable to produce a supply of electrical energy;
a prime mover operable to drive the generator;
a raw wellhead natural gas fuel supply delivered to the movable electrical generation system at a first pressure;
a scrubbing system receiving the raw wellhead natural gas fuel supply and conditioning the raw wellhead natural gas fuel supply to deliver a combustible natural gas fuel supply to the prime mover at a second pressure different than the first pressure;
a second, non-natural gas fuel delivered to the prime mover at a third pressure;
a fuel selector valve arranged to receive the first fuel supply at the second pressure and the second fuel supply at the third pressure and to deliver one of the first fuel and the second fuel to the engine; and
a controller operable to automatically adjust the fuel selector valve to deliver the second fuel to the prime mover in response to the second pressure being outside an acceptable pressure range.

17. The movable electrical generation system of claim 16, wherein the prime mover includes a plurality of pistons that each reciprocate within one of a plurality of cylinders.

18. The movable electrical generation system of claim 16, wherein the scrubbing system includes a primary pressure regulator operable to regulate the pressure of the raw wellhead natural gas.

19. The movable electrical generation system of claim 18, wherein the scrubbing system includes a coalescer and a dryer positioned to receive the raw wellhead natural gas from the primary regulator.

20. The movable electrical generation system of claim 19 wherein the scrubbing system includes a secondary pressure regulator operable to regulate the pressure of the raw wellhead natural gas leaving the coalescer and a dryer to the first pressure to produce the flow of combustible natural gas.

21. The movable electrical generation system of claim 16, wherein the second pressure is less than the third pressure.

22. The movable electrical generation system of claim 16, further comprising a gauge operable to measure a pressure of the fuel being delivered to the engine and non-numerically display which of the first fuel and the second fuel is being delivered to the engine based solely on the measured pressure.

23. The movable electrical generation system of claim 16, further comprising a manual fuel selector operable to override the controller and force delivery of a selected one of the first fuel supply and the second fuel supply regardless of the pressure of the first fuel supply.

* * * * *